United States Patent [19]

Baba

[11] 4,146,303
[45] Mar. 27, 1979

[54] STEREO-VIEWER AND STEREO-SHEET TO BE USED FOR THE SAME

[75] Inventor: Nobuyuki Baba, Tokyo, Japan

[73] Assignee: Gakken Co., Ltd., Tokyo, Japan

[21] Appl. No.: 790,272

[22] Filed: Apr. 25, 1977

[30] Foreign Application Priority Data

Apr. 30, 1976 [JP] Japan .............................. 51-54680[U]
May 10, 1976 [JP] Japan .............................. 51-58687[U]
Jul. 16, 1976 [JP] Japan .............................. 51-94641[U]

[51] Int. Cl.² .......................................... G02B 27/02
[52] U.S. Cl. .................................... 350/135; 350/133
[58] Field of Search .................... 350/133, 134, 135

[56] References Cited

U.S. PATENT DOCUMENTS 2,834,251 5/1958 Romrell .............................. 350/135

FOREIGN PATENT DOCUMENTS 1192560 10/1959 France ............................... 350/135
461795 2/1951 Italy ............................... 350/135

Primary Examiner—John K. Corbin
Assistant Examiner—Scott J. Sugarman
Attorney, Agent, or Firm—Irving M. Weiner; Pamela S. Austin; Melvin Yedlin

[57] ABSTRACT

A stereo-viewer and a stereo-sheet for use therewith, includes a set of oculars disposed in a horizontal plane in a case and separated from each other by the distance between the eyes of the user. The case has an insertion slot for accommodating the stereo-sheet which passes in the vertical direction through the case. A frame feeding device is connected to the case for moving the stereo-sheet in the vertical direction. No elements are required to change the direction of the path of the light in a vertical direction.

14 Claims, 15 Drawing Figures

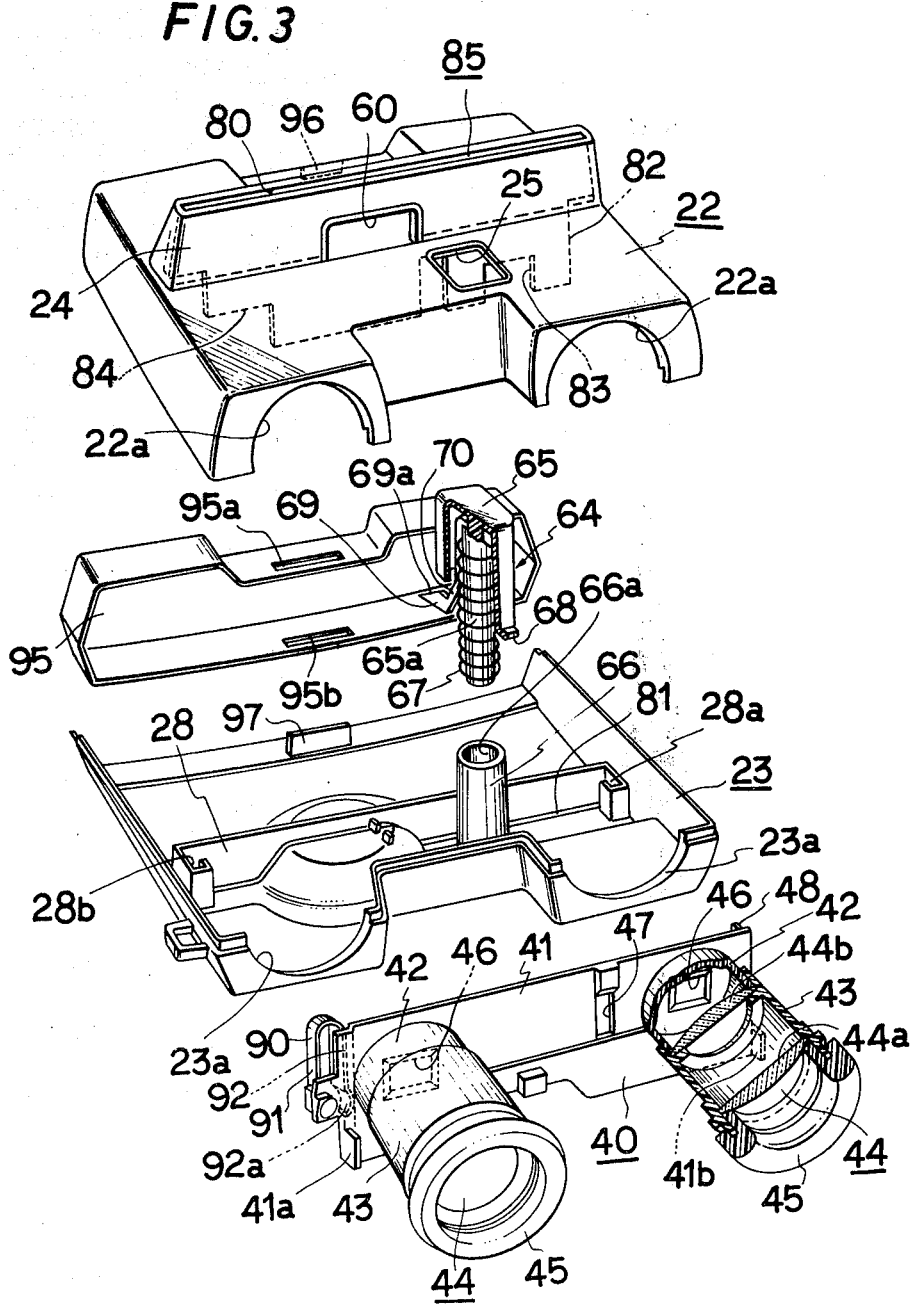

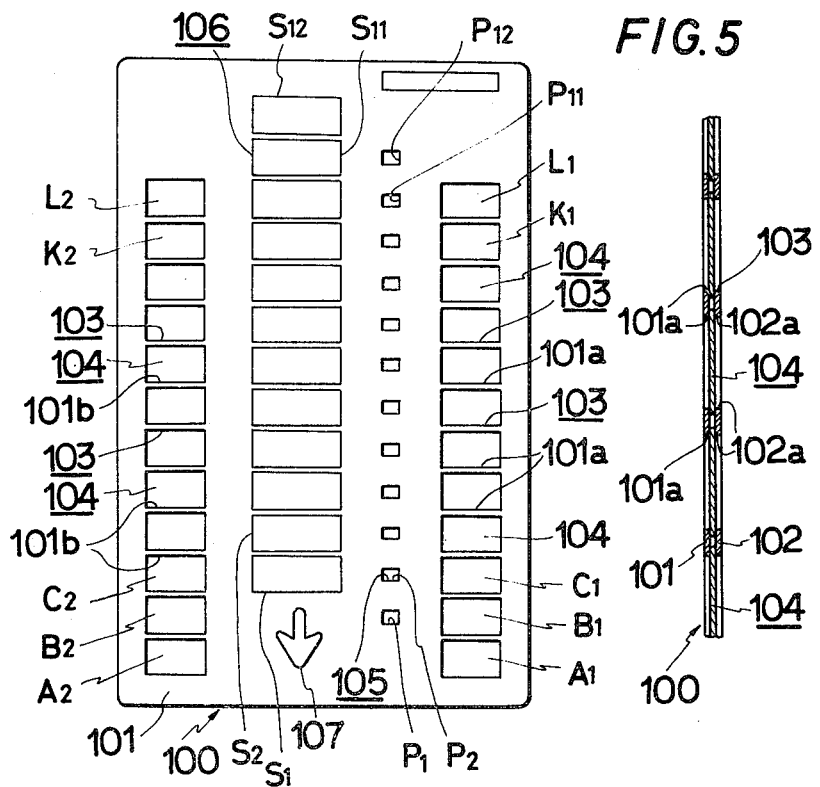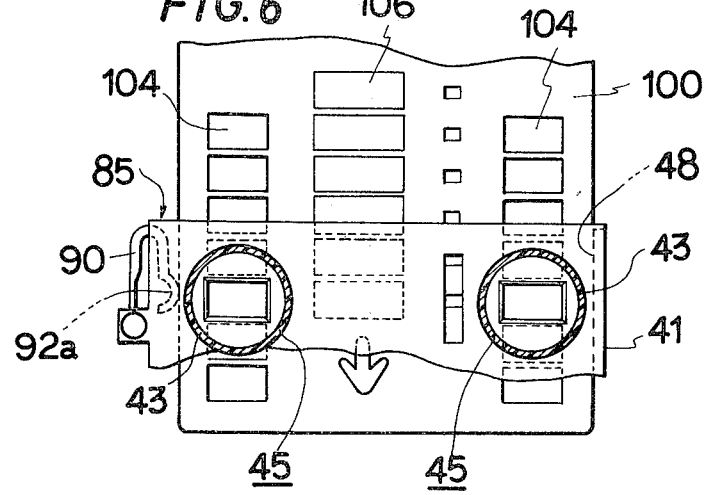

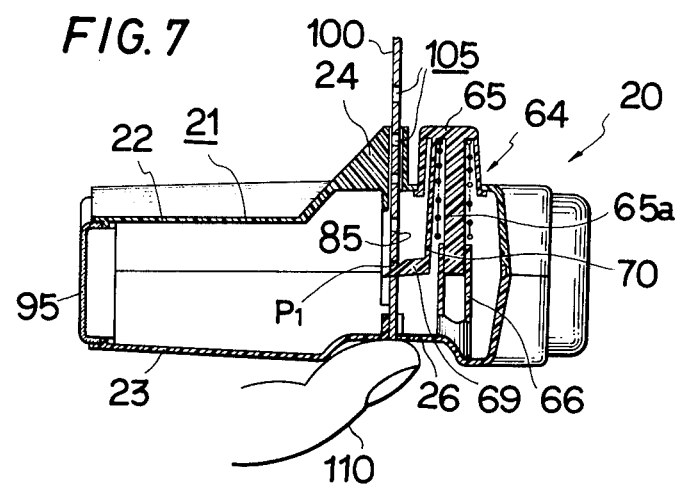
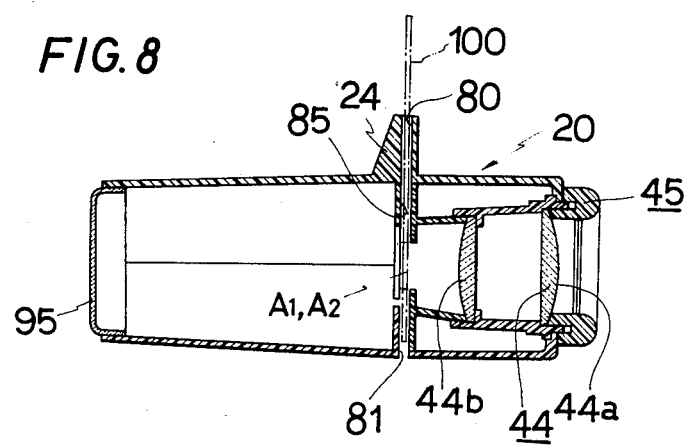

STEREO-VIEWER AND STEREO-SHEET TO BE USED FOR THE SAME

The present invention relates generally to stereo-viewers whereby plane picture images can be three-dimensionally viewed, and stereo-sheets to be used therefor.

More particularly, the invention relates to a stereo-viewer wherein an inserting hole for setting a stereo-sheet is formed in the vertical direction so that the structure may be simplified. The invention also relates to a stereo-sheet wherein stereo-images are arranged as a set in the horizontal direction, and are arranged in a plurality of sets in the vertical direction so that such picture images may be three-dimensionally viewed through a pair of right and left oculars fitted to the stereo-viewer.

BACKGROUND OF THE INVENTION

When a pair of stereo-images formed by photographing the same views or objects as separated from each other by the eyepoint distance are observed simultaneously with both eyes, such views or objects will be able to be viewed three-dimensionally viewed stereo-images is called a stereo-viewer.

In a conventional stereo-viewer, two oculars are arranged as separated from each other by the eyepoint distance and an inserting hole is formed in the horizontal direction, i.e., the same direction as the direction of arranging the oculars in front of them. Stereo-images are arranged on a stereo-sheet provided in a roll film type, and the sheet is equally divided into two halves in the width direction. One of the stereo-images of the pair is arranged on the upper half side of the divided stereo-sheet, and the other stereo-image is arranged on the lower half side so as to continuously provide stereo-images in many sets in the lengthwise direction of the stereo-sheet. Such stereo-sheet is inserted into the inserting hole and is set in the horizontal direction of the stereo-viewer, and light is taken in through a translucent light taking plate. The light will pass through the stereo-images and will be led to the oculars so that the observer may view a three-dimensional picture image by the pair of stereo-images.

In such case, the two oculars are arranged on the same level and the stereo-images of the pair are divided into an upper half and lower half as mentioned above and are in different level positions. Therefore, in order to lead the light from the stereo-images to the oculars, it is necessary to change the direction of the light in a vertical direction. In such stereo-viewer formed having the stereo-sheet inserted in the horizontal direction, in order to solve this problem, a reflector has been set to change the direction of the path of the light to be in a vertical direction by reflecting the light with the reflector.

Therefore, it is necessary to fit such stereo-viewer with a reflector in addition to the two oculars. Thus, the component parts increased to complicate the structure.

There is another known stereo-viewer wherein the stereo-sheet is formed to be of a rotary type. Therein, the stereo-sheet is formed to be circular, many stereo-images are arranged near the periphery of the sheet, and the stereo-images of the set are arranged as separated from each other by 180 degrees. A semicircular inserting groove is formed in the stereo-viewer so that the stereo-sheet may be set in this groove. When the stereo-sheet is rotated while in sliding contact with the inserting groove, the stereo-images of the pair will be opposed to the two oculars so that three-dimensional picture images by respective paris of stereo-images may be viewed continuously.

In this stereo-viewer, as a pair of stereo-images are opposed directly to the oculars on the same level, no reflector to change the direction of the path of the light will be required. However, as the stereo-sheet is rotated in sliding contact with the inserting groove, the stereo-sheet is likely to be damaged on its peripheral edge and to be broken by the rotating operation within the semicircular inserting groove. Further, in order that three-dimensional picture images may be continuously viewed with respective stereo-images, the respective stereo-images must be arranged at regular intervals near the periphery of the stereo-sheet. It is so difficult and toilsome to arrange respective stereo-images at regular intervals that the stereo-sheet is difficult to fabricate.

SUMMARY OF THE INVENTION

The present invention provides a stereo-viewer comprising a case, and a set of oculars fitted in the horizontal direction of said case at the eyepoint distance from each other on the same level. The case has an inserting hole formed in front of the oculars, which inserting hole passes in the vertical direction through the case, and serves to set in the vertical direction the stereo-sheet on which the stereo-images are arranged. Frame fitting means are connected to the case for moving the stereo sheet in the vertical direction.

The present invention includes the novel concept that, if a stereo sheet is inserted in the vertical direction instead of the horizontal direction, i.e., in the direction vertical to the direction of arranging two oculars, no level difference will be produced and a pair of stereo-images will be able to be opposed directly to the oculars.

An object of the invention is to provide a stereo-viewer wherein an inserting hole to set a stereo-sheet is formed in the vertical direction and oculars of a set are arranged in the horizontal direction separated from each other by the eyepoint distance.

Another object is to provide a stereo-sheet wherein a pair of stereo-images of a set are arranged in the horizontal direction and stereo-images are arranged in many such sets in the vertical direction, and to provide a stereo-sheet which is inserted in the vertical direction into the inserting hole to be set in a stereo-viewer.

An object is to provide a stereo-viewer wherein a pair of stereo-images can be opposed directly to two oculars without a level difference so that no reflector to change the direction of the path of the light is required, and the structure may be simple. There is provided a stereo-viewer wherein, by being moved vertically along the inserting hole, stereo-images of many sets are opposed to the oculars in turn so that three-dimensional images may be continuously viewed.

A further object is to provide a stereo-viewer provided with a frame feeding means for moving a stereo-sheet in the vertical direction for each pair of stereo-images, and to provide a stereo-viewer wherein, by the operation of a frame feeding means, many three-dimensional picture images can be continuously viewed.

An object of the invention is to provide a stereo-viewer wherein a stereo-sheet is moved only vertically along the inserting hole by frame feeding means so that the base sheet forming the stereo-sheet will not be damaged and the stereo-sheet may be safely fed by each frame. The invention provides a stereo-sheet wherein the stereo-images of respective sets may be merely arranged in the vertical direction, and thus the arrangement of the stereo-images is simple and fabrication thereof is easy.

A further object is to provide a stereo-viewer wherein a guide member is provided to project from the upper surface of the viewer, and the inserting hole is provided through this guide so that the stereo-sheet may move in the vertical direction along the guide member and may be positively fed therewithin.

Another object is to provide a stereo-sheet wherein an explanation of the contents of stereo-images is mentioned for the stereo-images of each pair, and to provide a stereo-viewer wherein a reading window, which is opposed to the oculars and in which the explanation of the stereo images of each pair is to appear, is formed in the guide member so that such explanation may be read through this reading window.

An object is to provide a stereo-viewer wherein not only three-dimensional picture images can be viewed, but also an explanation of each image can be read, and thus the three-dimensional picture images can be viewed more interestingly with this explanation, and a stereo-sheet to be used for the same.

Another object is to provide a stereo-viewer wherein a resiliently pressing member for resiliently pressing a stereo-sheet against one side wall of the inserting hole so that the stereo-sheet is automatically positioned in the horizontal direction by this resilient member, and thus the stereo-images are automatically accurately positioned in the horizontal direction for the oculars.

A further object is to provide a stereo-viewer wherein a concavity including the lower part of the inserting hole is formed in the lower surface of the viewer so that the stereo-sheet inserted into the inserting hole from above may be positioned in the vertical direction by being pressed on the lower side with a finger inserted into this concavity, and the stereo-images of the first set may be accurately opposed to the oculars.

BRIEF DESCRIPTION OF THE DRAWINGS

FIG. 3 is a disassembled perspective view of the stereo-viewer.

FIG. 4 is a plan view of a stereo-sheet according to the present invention.

FIG. 5 is a sectioned view of the stereo-sheet.

FIG. 6 is an explanatory view showing the positioning of a stereo-sheet in the horizontal direction.

FIG. 7 is an explanatory view showing the positioning of the stereo-sheet in the vertical direction.

FIG. 8 is a sectioned view showing a principle of viewing three dimensional picture images.

DETAILED DESCRIPTION

Figure 1:
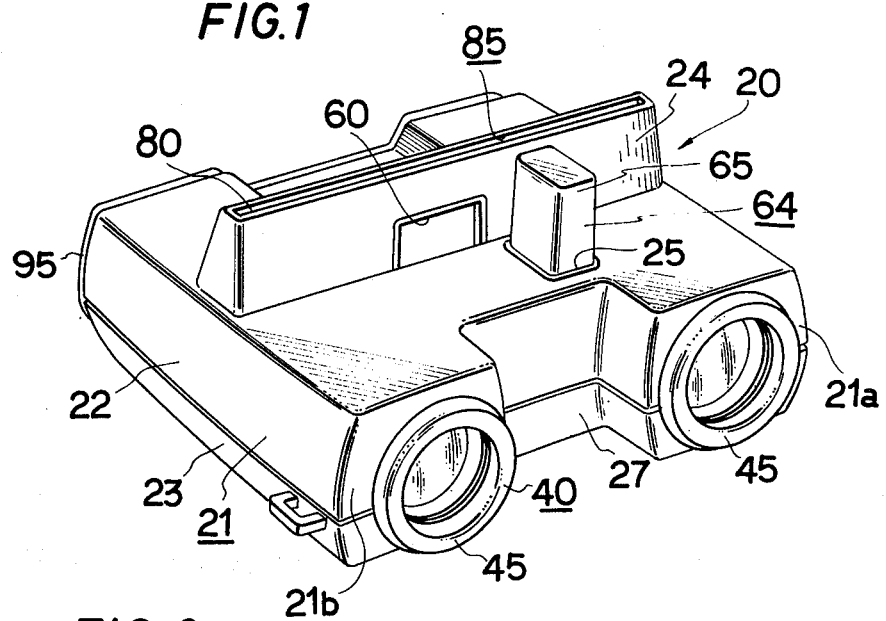
FIG. 1 is a top perspective view of a stereo-viewer according to the present invention.
Figure 2:
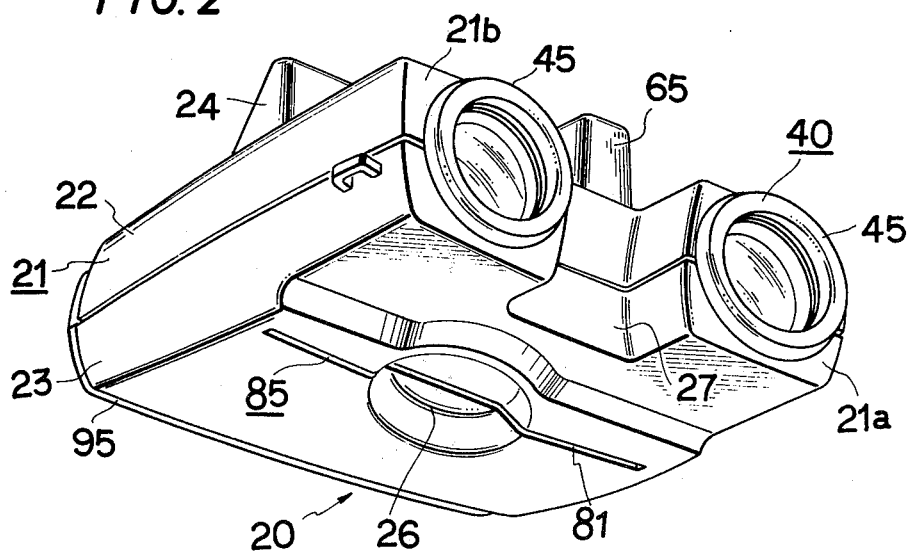
FIG. 2 is a bottom perspective view of the stereo-viewer.

As shown in FIG. 1, a stereo-viewer 20 according to the invention comprises a main case 21 formed of upper and lower cases 22 and 23 combined with each other, and a built-in case 40 held by the upper and lower cases 22 and 23 and fitted within the main case 21. An upper guide 24 extending in the width direction, i.e., the horizontal direction, of the case 22 is provided to rise from the upper surface of case 22. A slot 80 passing through the guide 24 is formed in the upper surface of guide 24. A reading window 60 is provided on one side surface of guide 24 and is made to communicate with slot 80. A hole 25 in which a pushing member 65 forming a frame feeding means 64 is inserted so as to be free to move in and out is formed in the upper surface of case 22. In the lower surface of case 23, as shown in FIG. 2, a slot 81 is provided to coincide with slot 80. A concavity 26 depressed inside case 23 is formed to include slot 81.

The built-in case 40 consists of a connecting plate 41 (FIG. 3) and cylindrical bodies 43 integrally fitted in respective cylinder parts 42 of plate 41. Two lenses 44a and 44b forming oculars 44 are fitted in the respective bodies 43. When the cases 22 and 23 are combined with each other, the cylindrical bodies 43 will be held by semicircular windows 22a and 23a made in the front surfaces of cases 22 and 23 and will project in the front parts out of the main case 21 to provide peeping parts 45 in the horizontal direction. Parts 45 are provided respectively in right and left projections 21a and 21b formed by an incision 27 dividing the front part of case 21 into two parts, and are formed on the same level while keeping the eyepoint distance.

On plate 41, peeping windows 46 are provided to coincide respectively with the centers of the oculars 44, and a slot 47 is formed in the vertical direction between windows 46. Projections 41a and 41b are provided at both ends of the lower part of plate 41. A supporting frame 28 surrounding slot 81 on three sides is provided to project inside the case 23. Projections 41a and 41b are inserted respectively into bag parts 28a and 28b formed at both ends of frame 28 to secure plate 41 to case 23. In case 23, a cylindrical body 66 is provided to project upwardly. A guide rod 65a projecting downwardly from pushing member 65 is inserted into the inside diameter hole 66a of body 66. A coil spring 67 is fitted to rod 65a to resiliently support pushing member 65 upwardly. A projecting piece 68 is formed at the lower end of member 65 to contact the inside surface of case 22 to regulate the rising limit of member 65.

Pushing member 65 is formed to be hollow box-shaped. A projection 70 provided with an engaging part 69 at its tip is provided to project downwardly from the inside top part of member 65, is made flexible, and forms an inclined part 69a on the upper surface of part 69. When pushing member 65 is fitted and inserted into cylindrical body 66, the tip of engaging part 69 will project out of slot 47 of connecting plate 41.

A U-shaped resiliently pressing spring 90 is fitted to one side end of plate 41 forming the built-in case 40, is secured only at one end 91 to connecting plate 41, and is made free at the other end 92 at which a circular projection 92a is formed.

A light taking plate 95 made of a translucent material and having a light passing property is fitted on the front surface of main case 21. Locking pieces 96 and 97 of cases 22 and 23 are engaged respectively with locking holes 95a and 95b of the light taking plate 95 so that plate 95 may be integral with case 21.

A light intercepting plate 82 is provided to project downwardly from one side wall of slot 80. Cuts 83 and 84, opposed respectively to the peeping windows 46 formed in connecting plate 41, are formed in the light intercepting plate 82. When case 22 is combined with case 23, the light intercepting plate 82 will face connecting plate 41 at a fixed distance so that an inserting hole 85 passing in the vertical direction through main case 21 may be formed between light intercepting plate 82 and connecting plate 41. Slots 80 and 81 provided respectively in cases 22 and 23 become both upper and lower end parts of the inserting hole 85 to form a part of hole 85.

When the stereo-viewer 20 is formed of assemblable members, such as the upper and lower cases 22 and 23, built-in case 40, frame feeding means 64, and light taking plate 95 as described above, the manufacture of the stereo-viewer will be able to be made very simple and the assembling work will be able to be made easy.

A stereo-sheet 100 is shaped to be rectangular as shown in FIG. 4, is set to be of a width substantially equal to the total length of the inserting hole 85, and is formed by integrally pasting together two base sheets 101 and 102 as shown in FIG. 5. Through holes 101a, 101b, 102a and 102b are arranged in the vertical direction on the right and left of respective base sheets 101 and 102. By setting the distances between holes 101a and 101b and between 102a and 102b to be equal to the eyepoint distance, window holes 103 separated from each other in the horizontal direction by a distance equal to the distance between oculars 44 are made on stereo-sheet 100. Respective stereo-images 104 are exposed through window holes 103 and are held and fixed with base sheets 101 and 102.

Stereo-images $A_1$ and $A_2$ forming a set are arranged respectively in the lowermost right and left window holes 103, and stereo-images $B_1$ and $B_2$ of another set are arranged respectively in next to the lowest right and left window holes 103. Thereafter, stereo-images $C_1$ and $C_2$, ... $K_1$ and $K_2$, $L_1$ and $L_2$, forming respective sets are arranged in turn in the vertical direction of the stereo-sheet. As a result, a pair of stereo-images forming a set will be arranged in the horizontal direction, and many sets of stereo-images will be arranged in the vertical direction. As many perforations 105 as the sets of stereo-images are made in the vertical direction on the stereo-sheet 100. The respective perforations $P_1$, $P_2$, ... $P_{11}$, $P_{12}$ are to frame-feed the stereo-sheet 100 for each set of stereo-images. As many indicating frames 106 as the sets of the stereo-images 104 are made in the vertical direction on the surface of one base sheet 101 and explanations of the three-dimensional picture images which can be viewed with the stereo-images 104 are mentioned inside the respective indicating frames $S_1$, $S_2$, ... $S_{11}$, $S_{12}$ so that the explanation may be indicated on stereo-sheet 100 for each set of stereo-images. An arrow 107 is indicated below the lower-most indicating frame $S_1$, and is to indicate the inserting direction for inserting the stereo-sheet 100 into the inserting hole 85 of viewer 20.

When the size and contour of the stereo-sheet 100 are made the same as those of a postcard, the sheet 100 will be able to be posted, and thus the stereo-sheet 100 on which stereo-images of historic sites and famous places in sight-seeing are formed will be able to be sent by mail.

Sheet 100 is inserted through slot 80 provided in upper guide 24 of the stereo-viewer 20, and is set in hole 85 communicating with slot 80. In such case, as shown in FIG. 6, one side of the stereo-sheet 100 will contact projection 92a of spring 90. The other side of sheet 100 will be resiliently pressed against the projecting piece 48 of plate 41 by the resiliency of spring 90 so that the stereo-sheet 100 may be positioned in the horizontal direction. As shown in FIG. 7, a finger 110 is inserted into the concavity 26 formed in the lower case 23 and the stereo-sheet 100 is stopped on its lower side by finger 110 and is positioned in the vertical direction. Thereby, the stereo-images $A_1$ and $A_2$ of the pair in the lowermost part will be accurately opposed to oculars 44 on the same level by the positioning in the vertical and horizontal directions.

Figure 9:
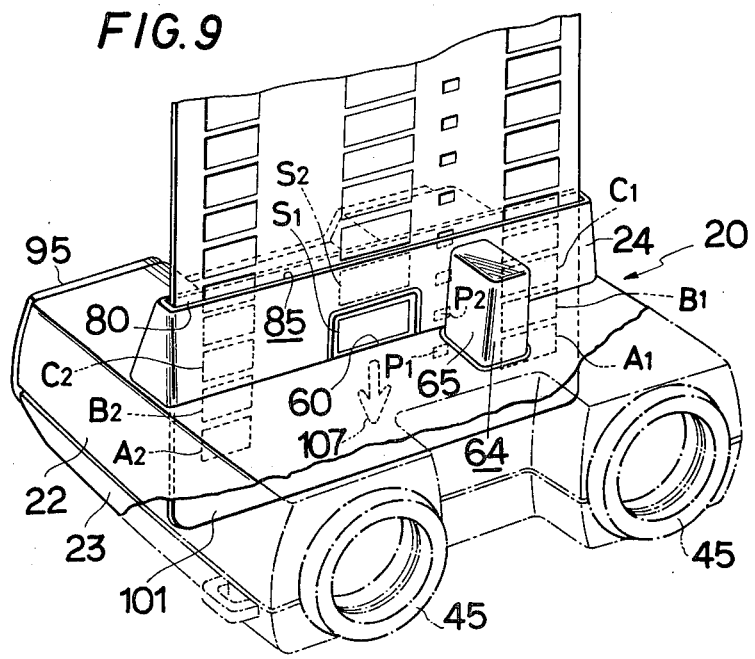
FIG. 9 is an explanatory view showing the reading of an explanation through a reading window.

As shown in FIG. 8, light comes in through the light taking plate 95 and passes through the stereo-images $A_1$ and $A_2$ and through oculars 44 so that an observer peeping into the stereo-viewer 20 through peeping parts 45 may view three-dimensional picture images by a pair of stereo-images $A_1$ and $A_2$. At the same time as the stereo-sheet 100 is positioned in the vertical direction, as shown in FIG. 9, the indicating frame $S_1$ will be exposed out of the reading window 60 of the upper guide 22. By reading the explanation mentioned on the indicating frame $S_1$, the observer can view the three-dimensional picture image more interestingly.

Figure 10:
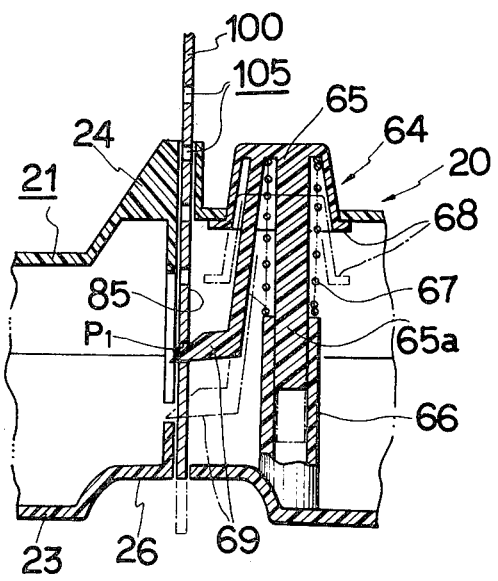
FIG. 10 is a sectioned view showing the frame-feeding a stereo-sheet.

At the same time as a pair of stereo-images $A_1$ and $A_2$ are opposed to the oculars 44, as shown in FIG. 10, the projection 70 of the frame feeding means 64 will engage with the lowermost perforation $P_1$. When the pushing member 65 is pushed down against spring 67, the engaging part 69 of projection 70 will move the stereo-sheet 100 downwardly by one frame. When the pressing force of the pushing member 65 is released, the inclinded part 69a of engaging part 69 will contact the upper surface of the perforation $P_1$ and the projection 70 will flex and retreat. By the pushing member 65 elevated by the resiliency of spring 67, the engaging part 69 will be engaged with the next perforation $P_2$.

At this time, the frame-feeding of the stereo-sheet 100 will be completed and the oculars 44 will be opposed to the next pair of stereo-images $B_1$ and $B_2$. When the observer peeps through the peeping parts 45, he will be able to view three-dimensional picture images by these stereo images $B_1$ and $B_2$. In this case, too, the indicating frame $S_2$ on which the explanation of these stereo-images $B_1$ and $B_2$ is mentioned will be exposed out of the reading window 60. When the pushing member 65 is pushed down in turn, the respective stereo-images $C_1$ and $C_2$, ... $L_1$ and $L_2$ will be opposed to the oculars 44 so that three-dimensional picture images may be viewed. Explanations of the three-dimensional picture images will be able to be read from the indicating frames exposed out of reading window 60.

As the stereo-sheet 100 is fed in the vertical direction through the inserting hole 85 and is fed while being positioned in the horizontal direction by the resiliently pressing spring 90, the respcetive stereo-images can be accurately opposed to oculars 44 so that clear three-dimensional picture images may be viewed. As sheet 100 is moved through the inserting hole 85 along guide 24, the stereo-sheet 100 will positively move maintained vertical to case 21 without falling forwardly or rearwardly.

Figure 11:
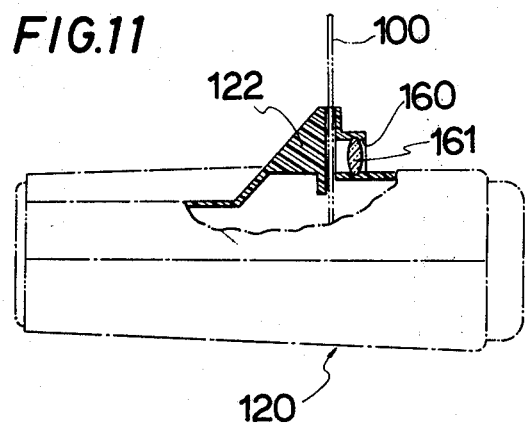
FIG. 11 is an explanatory view of a modified stereo-viewer provided with a magnifying lens in a reading window.

In a stereo-viewer shown in FIG. 11, a magnifying lens 61 is fitted to a reading window 160 formed in an upper guide 122 so that an indicating frame 106 of the stereo-sheet 100 exposed out of window 160 may be magnified by lens 161 and the explanation of the three-dimensional picture image mentioned in the narrow space may be positively and clearly read by the observer.

Figure 12:
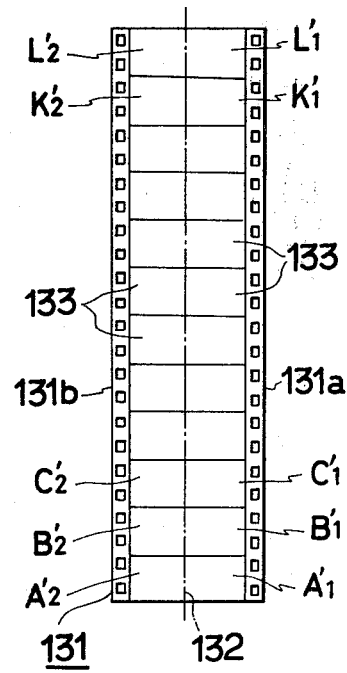
FIG. 12 is a plan view of a roll film forming stereo-Images.
Figure 14:
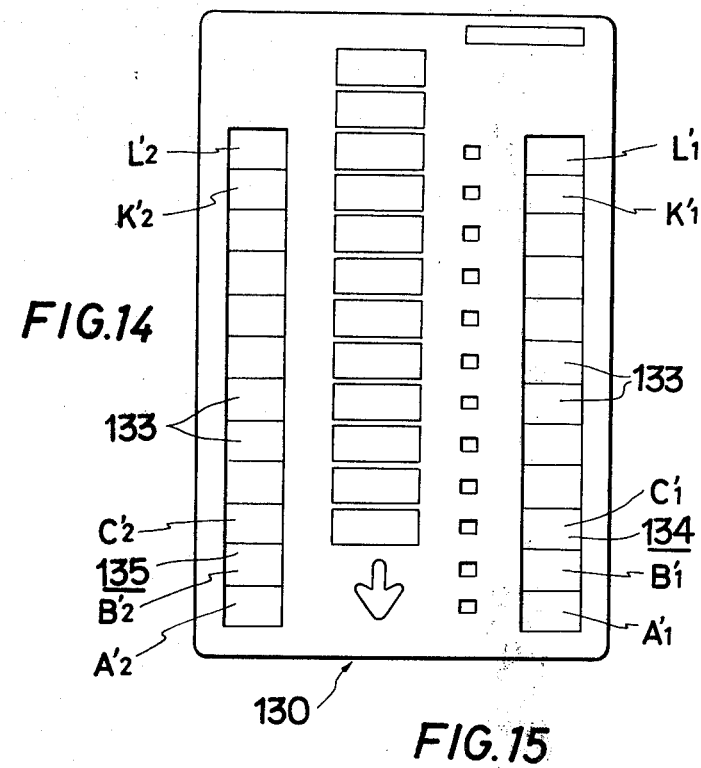
FIG. 14 is a plan view of a modified stereo-sheet using a roll film.

In stereo-sheet 130 shown in FIG. 14, stereo-images 133 are formed by using a roll film. As shown in FIG. 12, a roll film 131 cut to proper length is equally divided into two right and left film halves 131a and 131b along the center line in the length direction. Stereo-images 133 are formed in the length direction on the respective film halves 131a and 131b. Stereo-images $A_1'$, $B_1'$, $C_1'$, ... $L_1'$, of many sets on one side are arranged on the film half 131a, and stereo-images $A_2'$, $B_2'$, $C_2'$, ... $L_2'$, of many sets on the other side are arranged on the film half 131b. Stereo-images $A_1'$ and $A_2'$ of a pair are made adjacent to each other in the width direction, and the stereo-images 133 are thus arranged to make many sets in the length direction.

For stereo-images 133 formed on the roll film 131, a negative film obtained by photographing views or the like will be able to be printed on the roll film 131 and the manufacture of stereo-images will be able to be made very simple.

Figure 13:
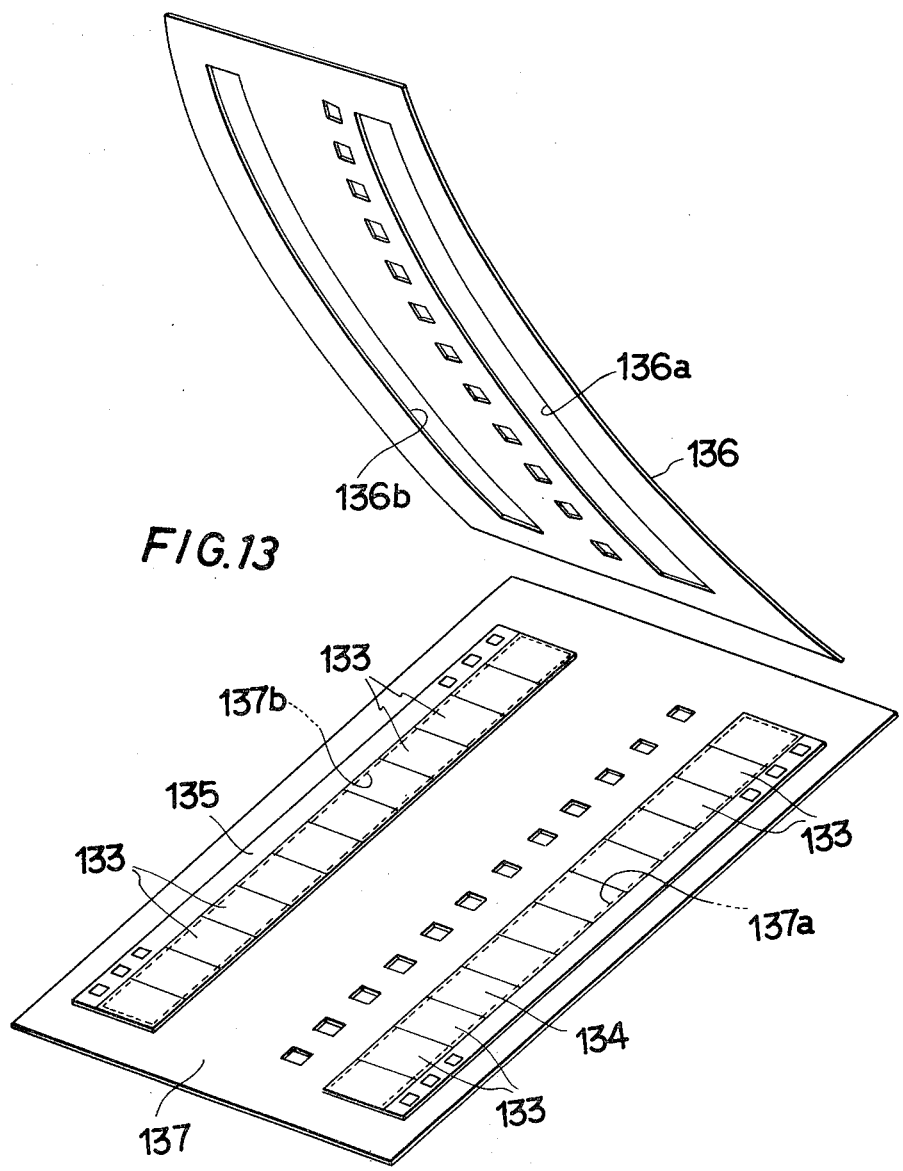
FIG. 13 is an explanatory view showing the making a stereo-sheet from a roll film.

Film 131 is cut along the center line 132 to make a pair of two divided film pieces 134 and 135. As shown in FIG. 13, the film pieces 134 and 135 are placed between two base sheets 136 and 137, respectively, having slots 136a, 136b and 137a, 137b made in the vertical direction. When pieces 134 and 135 are exposed respectively out of slots 136a, 136b and 137a, 137b and are held and fixed with the base sheets 136 and 137, the stereo-sheet 130 shown in FIG. 14 will be able to be made.

Because pieces 134 and 135 may be held with the base sheets 136 and 137, the trouble of arranging the stereo-images on the base sheet for each frame will be avoided and the manufacture of the stereo-sheet will be made very simple.

Figure 15:
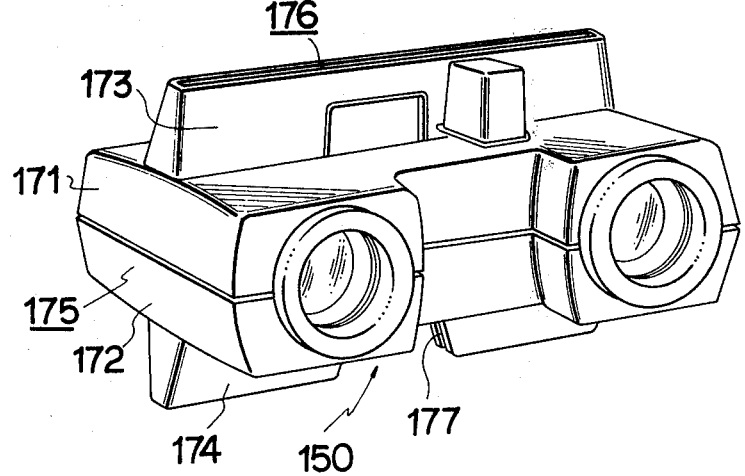
FIG. 15 is a perspective view of another embodiment a stereo-viewer provided with an additional guide on the lower surface thereof.

In a stereo-viewer 170 shown in FIG. 15, upper and lower guides 173 and 174 are provided to project respectively from upper case 171 and lower case 172. An inserting hole 176 passing in the vertical direction through a main case 175 is formed within guides 173 and 174 so that a stereo-sheet may be inserted through guide 173 and may be pulled out through guide 174. As the stereo-sheet is guided by both guides 173 and 174 to move through hole 176, it can be set more positively in hole 176.

A concavity 177 cut into the main case 175 side is formed in guide 174 so that the stereo-sheet may be positioned in the vertical direction with a finger inserted into concavity 177. By making the depth of concavity 177 as large as possible, the stereo-images can be arranged close to the lower side of the stereo-sheet and thus more stereo-images can be arranged on the stereo-sheet.

I claim:

1. A stereo-viewer, comprising:
a case;
a set of oculars fitted in the horizontal direction of said case at the eyepoint distance from each other on the same level;
said case having an inserting hole formed in front of said oculars, passing in the vertical direction through said case, and setting in the vertical direction a stereo-sheet on which stereo-images are arranges;
frame feeding means connected to said case and moving said stereo-sheet in the vertical direction; wherein
a guide is provided to project from the upper surface of said case;
said inserting hole is formed through said guide and is extended upwardly;
a concavity depressed inside said case to include the lower part of said inserting hole is formed on the lower surface of said case so that said stereo-sheet inserted into said inserting hole from above is pressed on its lower side with a finger inserted into said concavity and is positioned in the vertical direction;
a resiliently pressing member connected at one side end in said inserting hole pressing said stereo-sheet set in said inserting hole against the other side end in the horizontal direction of said inserting hole so that said stereo-sheet is positioned in the horizontal direction by said resiliently pressing member; and
said frame feeding means includes a pushing member always pressed upwardly by a spring and a flexible projection fixed integrally to said pushing member so that, by engaging the tip of said projection with a perforation in said stereo-sheet between said stereo-images and pressing said pushing member downwardly, said stereo-sheet is moved downwardly.

2. A stereo-viewer according to claim 1, wherein:
a reading window communicating with said inserting hole is formed in said guide so that explanations of said stereo-images mentioned on said stereo-sheet can be viewed through said reading window.

3. A stereo-viewer according to claim 2, wherein:
a magnifying lens is connected to said reading window.

4. A stereo-viewer according to claim 1, wherein:
said resiliently pressing member is a U-shaped spring fixed only at one end in said inserting hole.

5. A stereo-viewer comprising:
a case;
a set of oculars fitted in the horizontal direction of said case at the eyepoint distance from each other on the same level;
said case having an inserting hole formed in front of said oculars, passing in the vertical direction through said case, and setting in the vertical direction a stereo-sheet on which stereo-images are arranged;
frame feeding means connected to said case and moving said stereo-sheet in the vertical direction;
an upper guide and lower guide are provided to project respectively on both upper and lower surfaces of said case;
said inserting hole is formed through said upper and lower guides and is extended in the vertical direction;
a concavity cut into said case is formed in said lower guide so that said stereo-sheet inserted into said inserting hole from above is pressed on its lower side with a finger inserted into said concavity and is positioned in the vertical direction;

a resiliently pressing member connected at one side end in said inserting hole pressing said stereo-sheet set in said inserting hole against the other side end in the horizontal direction of said inserting hole so that said stereo-sheet is positioned in the horizontal direction by said resiliently pressing member; and said frame feeding means includes a pushing member always pressed upwardly by a spring and a flexible projection fixed integrally to said pushing member so that, by engaging the tip of said projection with a perforation in said stereo-sheet between said stereo-images and pressing said pushing member downwardly, said stereo-sheet is moved downwardly.

6. A stereo-viewer according to claim 5, wherein: said resiliently pressing member is a U-shaped spring fixed only at one end in said inserting hole.

7. A stereo-viewer according to claim 5, wherein: a reading window communicating with said inserting hole is formed in said guide so that explanations of said stereo-images mentioned on said stereo-sheet can be viewed through said reading window.

8. A stereo-viewer according to claim 7, wherein: a magnifying lens is connected to said reading window.

9. A stereo-sheet for use in a stereo-viewer, wherein: a pair of said stereo-images are arranged as a set in the width direction of a roll film;

said stereo-images are arranged in a plurality of sets in the lengthwise direction of said roll film;

said roll film is cut in the lengthwise direction to form two film pieces;

said film pieces are arranged in the vertical direction separated from each other in the horizontal direction by said eyepoint distance;

each said pair of said stereo-images is arranged as a set with said stereo-images being separated from each other by said eyepoint distance in the horizontal direction;

said stereo-images are arranged in a plurality of sets in the vertical direction;

perforations formed in the vertical direction and in an amount equal to the number of said sets of stereo-images; and said perforations in said stereo-sheet are each placed in an area of said stereo-sheet between said pairs of stereo-images.

10. A stereo-sheet according to claim 9, including: as many indicating frames as said sets of stereo-images are provided and arranged in the vertical direction on a base sheet of said stereo-sheet, and explanations of three-dimensional picture images by said stereo-images are mentioned on said indicating frames.

11. A stereo-sheet according to claim 10, including: an arrow indicating the inserting direction into said inserting hole is provided and indicated on said stereo-sheet;

said arrow being located below the lowermost of said indicating frames and substantially at the same level as the lowermost of said sets of stereo-images; and said perforations being formed between said indicating frames and one stereo-image of each pair of stereo-images.

12. A stereo-sheet according to claim 11, wherein: the size and contour of said stereo-sheet are made to coincide with those of a postcard.

13. A method of making a stereo-sheet according to claim 9, comprising the steps of:

photographing the scene to be depicted in said stereo-sheet on a first photographic negative roll film using a conventional stereoscopic camera;

developing said first photographic negative roll film;

printing images upon said developed first photographic negative roll film upon a second photographic roll film;

developing said second photographic roll film;

cutting said second photographic roll film along the centerline thereof in a lengthwise direction to form a plurality of third film strips;

placing two said third film strips between two base sheets having slots in the vertical direction thereof; and firmly fixing said base sheets together, thereby retaining said film strips therebetween.

14. A method of making a stereo-sheet according to claim 13, including the steps of:

printing images upon said developed second photographic roll film upon a plurality of third photographic roll films;

developing each of said plurality of third photographic roll films;

cutting each said third photographic roll film along a central axis thereof; and cutting each said third photographic roll film in a traverse direction in a plurality of places to form a plurality of said third film strips.

* * * * *